United States Patent [19]

Miyauchi et al.

[11] 4,290,641

[45] Sep. 22, 1981

[54] METALLIC PANEL REINFORCING SYSTEM

[75] Inventors: Seiroku Miyauchi, Yokohama; Yasuo Sagane, Zama; Kazuo Irie, Yokohama, all of Japan

[73] Assignee: Asahi Glass Company, Limited, Tokyo, Japan

[21] Appl. No.: 79,195

[22] Filed: Sep. 26, 1979

[30] Foreign Application Priority Data

Oct. 6, 1978 [JP] Japan ................................. 53/122738
Dec. 6, 1978 [JP] Japan ................................. 53/150032

[51] Int. Cl.³ .............................................. B60J 5/04
[52] U.S. Cl. ....................................... 296/146; 52/732
[58] Field of Search ................. 296/188, 146; 52/730, 52/732, 737, 738, 739

[56] References Cited

U.S. PATENT DOCUMENTS 3,868,141 2/1975 Johnson .............................. 296/146
3,868,796 3/1975 Bush ................................... 296/146
3,938,288 2/1976 Roubinet ............................ 296/146
4,013,317 3/1977 Reidelbach et al. ................ 296/188

FOREIGN PATENT DOCUMENTS 2426705 12/1975 Fed. Rep. of Germany ...... 296/146

Primary Examiner—Joseph F. Peters, Jr.
Assistant Examiner—Ross Weaver
Attorney, Agent, or Firm—Oblon, Fisher, Spivak, McClelland & Maier

[57] ABSTRACT

A metallic panel is reinforced by a FRP reinforcing beam by fixing both ends of the reinforcing beam on the metallic panel. The reinforcing beam comprises two or more flanges and one or more web plate connecting to said flanges at the position near the metal panel side from the center line of the flanges but departed from the edges of the flanges. The reinforcing beam is arranged to place the flanges in substantially perpendicular to the metallic panel.

5 Claims, 12 Drawing Figures

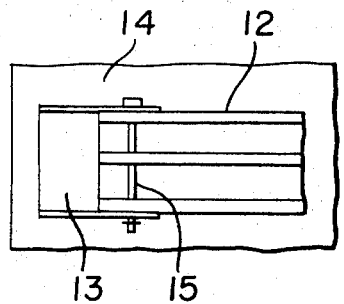
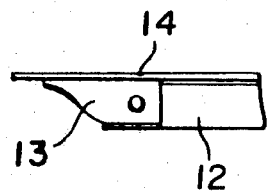
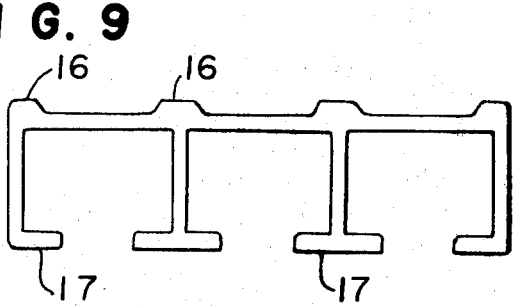
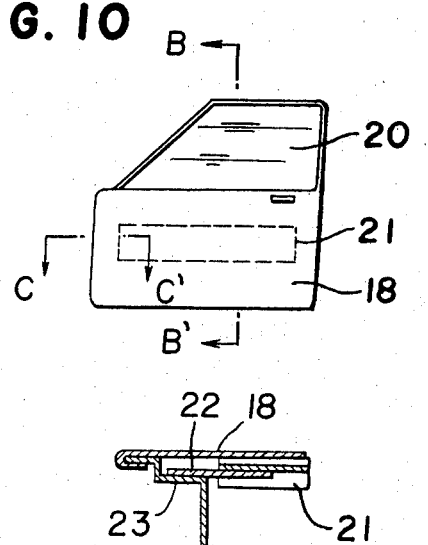
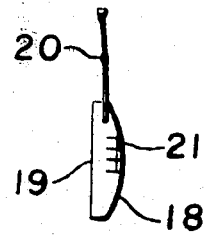

METALLIC PANEL REINFORCING SYSTEM

BACKGROUND OF THE INVENTION

1. Field of the Invention

The present invention relates to a system for reinforcing a metallic panel by a reinforcing beam made of a fiber reinforced plastic (hereinafter referring to as FRP refinforcing beam). More particularly, it relates to a system for reinforcing a metallic panel by fixing both ends of a FRP reinforcing beam having a specific sectional configuration.

Background of the Invention

Recently, it has been studied to attain lightweighting of automobiles in order to improve a fuel efficiency of the automobile. In the lightweighting of the automobile, it has been considered to use lightweight metallic parts as well as to replace metallic parts with lightweight plastic parts. An outer plate of the automobile such as an outer panel of a door is usually made of a steel. In order to reinforce the outer panel, a metallic reinforcing beam has been fixed. For example, the reinforcing beam for the outer panel of the door has been called a side guard beam or a side impact bar. In order to provide a lightweight door, it has been considered to use a plastic side guard beam instead of a metallic side guard beam. However, when a conventional plastic side guard beam is used, it has not enough to provide a desired strength for example, a satisfactory strength of a door in an industrial standard (such as FMVSS No. 214 in U.S.A.).

The inventors have studied FRP side guard beams having excellent tensile strength. However, it has been found that a desired strength could not be given by using FRP side guard beam having a configuration of the conventional metallic side guard beam. For example, the desired strength could not be given by a FRP side guard beam having configuration of I beam, U-shape channel having flat bottom or L-shape angle.

SUMMARY OF THE INVENTION

It is an object of the present invention to provide a system for reinforcing a metallic panel by a FRP beam having a specific sectional configuration.

It is another object of the present invention to provide a system for reinforcing an outer plate of an automobile such as an outer panel of a door of an automobile by a FRP side guard beam.

It is the other object of the present invention to provide a lightweight automobile by replacing the conventional metallic side guard beam to a lightweight FRP side guard beam having a special sectional configuration.

The further object of the present invention is to provide a system for reinforcing a metallic panel by a FRP reinforcing beam comprising two or more flanges and one or more web plate connecting the flanges.

The foregoing and other objects of the present invention have been attained by providing a system for reinforcing a metallic panel by a reinforcing beam arranged in substantially parallel to the metallic panel, wherein the reinforcing beam is a FRP reinforcing beam comprising two or more flanges and one or more web plate connecting the flanges and the flanges of the reinforcing beam are arranged in substantially perpendicular to the metallic panel and the web plate is connected to the flanges at a position near the metal panel side from the center line of the flanges but departed from the edges of the flanges.

BRIEF DESCRIPTION OF THE DRAWINGS

FIG. 7 is a rear plane view of the system in the other connection;

FIG. 8 is a side view of the system shown in FIG. 7;

FIG. 9 is a sectional view of an improved embodiment of the reinforcing beam used in the present invention;

FIG. 10 is a front view of a door of an automobile;

FIG. 11 is a sectional view taken along the line B—B'; and

FIG. 12 is a partially enlarged sectional view taken along the line C—C'.

DETAILED DESCRIPTION OF THE PREFERRED EMBODIMENTS

The system of the present invention is to reinforce a metallic panel by a reinforcing beam which is arranged in substantially parallel to the metallic panel or near the metallic panel. In usual, both ends of the reinforcing beam in the longitudinal direction are directly or indirectly fixed on the metallic panel. The fixed positions need not be the top ends of the reinforcing beam. Only the part of the metallic panel between the fixed positions is reinforced. Thus, the part between the fixed position to the top end does not impart the reinforcing function. The reinforcing beam is made of FRP and comprises two or more flanges and one or more web plate for connecting the flange. That is, the reinforcing beam comprises two or more slender plates arranged in substantially parallel (flanges) and a slender plate connecting the adjacent slender plates in substantially perpendicular to the slender plates (web plate).

Figure 1:
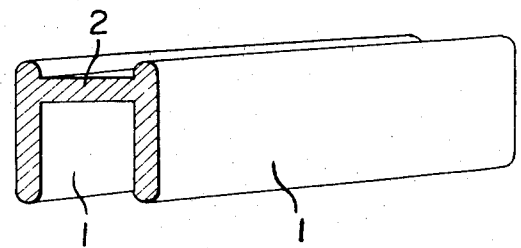
FIG. 1 is a schematic view of a reinforcing beam used in the present invention.
Figure 2:
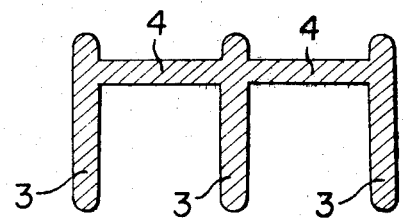
FIG. 2 is a sectional view of another reinforcing beam used in the present invention.

The reinforcing beam shown in FIG. 1 comprises two flanges (1) and one web plate (2). The reinforcing beam shown in FIG. 2 comprises three flanges (3) and two web plates (4). The number of the flanges and the number of the web plates are not critical and the number of the flanges is preferably 7 or less.

Figure 3:
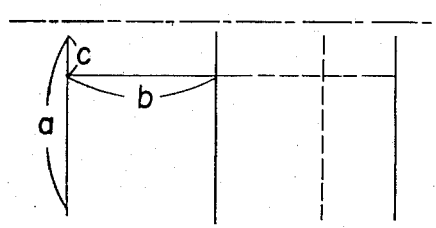
FIG. 3 shows a skeleton of the section of the reinforcing beam used in the present invention.

In the skeleton of the reinforcing beam shown in FIG. 3, the height of the flange is a; the width of the web is b; and the shorter distance between the edge of the flange to the fixed part of the web plate is c and the position of the metallic panel is shown by the dotted chain line. The structure of the system of the present invention is as follows:

The surfaces of the flanges should be substantially in perpendicular to the metallic panel. That is, the surface of the web should be substantially in parallel to the metallic panel. The web plate should be placed at the position near the metal panel side from the center line of the flanges, that is, the upper side in FIG. 3 but the web plate should not be placed at the ends of the flanges. The web plate should be arranged in the position of $0 < c < \frac{1}{2}a$. In the consideration of the thickness of the web plate, the distance between the edge of the flange to the surface of the web is not zero. When the edge of the flange is brought into contact with the metallic panel, the surface of the web should not contact with the surface of the metallic panel. Moreover, the web plate should be in the metallic panel side which is the upper side in FIG. 3. That is, the surface of the web plate should be substantially in parallel to the metallic panel and near the metallic panel.

When a panel is reinforced by a I shape beam, the flange surface are usually arranged in substantially parallel to the panel. However, it is not preferable to arrange the flange surface in parallel to the panel which causes elastic deformation and it is especially not preferable to contact the flange surface with the panel.

In accordance with the present invention, the surface of the web plate is arranged in substantially parallel to the panel and should not be easily brought into contact with the metallic panel. The latter is one of the reasons for the feature that the surface of the web plate should not be at the edges of the flanges.

When a force caused by the elastic deformation of the metallic panel is applied to the reinforcing beam, a tensile force is applied at the lower end and a compression force is applied at the upper end. The breaking stress of the flange in tensile is higher than the breaking stress in compression. Thus, when the distance c is increased, the difference between the tensile stress and the compression stress caused at both ends of the flange is decreased whereby the bending break of the web plate is increased. Therefore, the distance c should not be more than $\frac{1}{2}a$.

From the above-mentioned viewpoint, it is necessary to give the relation of a and c in $0<c<\frac{1}{2}a$, preferably $\frac{1}{8}a \leq c \leq \frac{3}{8}a$, especially $1/7\ a \leq c \leq \frac{1}{4}a$. The relation of a and b is not critical and is preferably in $\frac{1}{2}a < b < 2a$ especially $a \leq b \leq 1.5a$. It is not always necessary to give the same values a, b or c for all of the flanges and the web plates. The values a, b and c are depending upon the size of the reinforced metallic panel, the strength of the reinforcing beam and other conditions. For example, when the outer panel of an automobile is reinforced, a is usually in a range of 1 to 10 cm especially 2 to 5.

Figure 4:
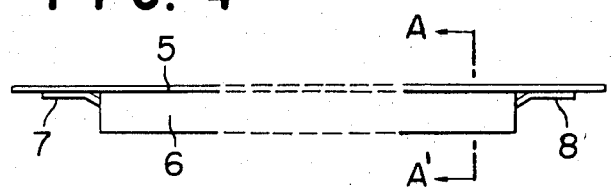
FIG. 4 is a side view showing a system for fixing a reinforcing beam to a metallic panel.
Figure 5:
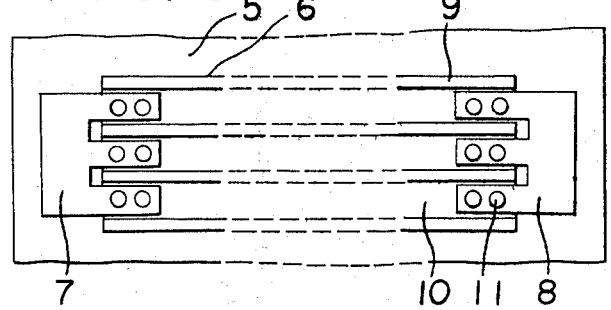
FIG. 5 is a rear plane view of the system shown in FIG. 4.
Figure 6:
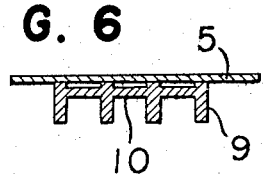
FIG. 6 is a sectional view taken along the line A—A'.

FIGS. 4, 5 and 6 show the condition fixing the reinforcing beam on the metallic panel. The reinforcing beam (6) is fixed on the metallic panel (5) by two metal joints (7), (8). The reinforcing beam (6) comprises the four flanges (9) and the three web plates (10). The two joints are fixed on the web plates (10) at the both ends of the reinforcing beam (6) by bolts or rivets (11). The two joints are welded on the metallic panel.

The fixing of the reinforcing beam on the metallic panel is preferably carried out by a mechanical fixing of the reinforcing beam to the metallic joint which is brazed on the metallic panel. FIGS. 7 and 8 show the other system for fixing them. The reinforcing beam (12) is fixed on the metallic panel (14) by the metallic joint (13). The joint (13) and the reinforcing beam (12) are mechanically fixed by bolts (15) inserted into the flanges of the reinforcing beam. The metallic panel (14) is welded to the joint. The fixing of the reinforcing beam on the metallic panel is not limited to these manners. It is possible to fix indirectly the reinforcing beam to the metallic panel (See FIG. 12) or to fix directly the reinforcing beam to the metallic panel or to fix mechanically the joint to the metallic panel, etc.

The sectional configuration of the reinforcing beam can be modified depending upon the purpose. FIG. 9 shows one embodiment of the improved reinforcing beams. One improvement is to have wide width of the edge (16) of the flange at the metallic panel side. This part contacts with the metallic panel and is easily bent. Thus, it is preferable to have wide width; the other improvement is to have wide width of the other edge (17) of the flange. When bending stress is applied to the reinforcing beam, greatest tensile strength is applied in perpendicular to the plane of the drawing. Thus, the strength of the reinforcing beam is remarkably improved by increasing the strength of the edge. The strength of the edge (17) can be also increased by increasing the density of the reinforced fiber at this edge part or using a special reinforcing fiber having higher tensile strength than the fiber used in the other reinforced part. As the other improvement other than the improvement shown in FIG. 9, a reinforcing plate can be inserted adjacent to the fixing part for reinforcing the web of the metallic joint or the strengthening of the fixing part for fixing the flange and the web plate is increased.

FIGS. 10, 11 and 12 show a door of an automobile on which the reinforcing beam is fixed. The door comprises an outer panel (18), an inner panel fixed on the outer panel (18), a window glass (20), and a reinforcing beam (21) arranged on the rear surface of the outer panel (18). As shown in FIG. 12, the reinforcing beam (21) is fixed on the stepped part (23) of the inner panel (19) by the metallic joint (22) by a spot welding etc.

The reinforcing system of the present invention can be applied for the reinforcing of a metallic panel of a door or other outer plates of an automobile or of other parts of an auotmobile or a metallic panel of the other vehicles, buildings etc.

The FRP used for the reinforcing beam is preferably a fiber reinforced thermosettable resin.

Suitable thermosettable resins include unsaturated polyester resins, epoxy resins, phenolic resins and vinyl ester resins.

Suitable reinforcing fibers include inorganic fibers such as glass fiber, carbon fiber, ceramic fiber and organic fibers such as synthetic fibers. It is especially preferable to use glass fiber. The reinforcing fiber is preferably orientated in the longitudinal direction of the reinforcing beam. It is especially preferable to orientate continuous reinforcing fiber such as glass fiber roving in the longitudinal direction. It is not always necessary to orientate all of the reinforcing fibers in the longitudinal direction. In order to give a desired strength to the other direction, the reinforcing fibers which are orientated in the other direction or which are not orientated can be preferable incorporated.

The reinforcing beam should have the specific sectional configuration. Therefore, it is suitable to fabricate it by a plutrusion method though it is not critical and the reinforcing beam can be also fabricated by a matched die press or the other method.

The FRP can be a fiber reinforced thermoplastic resin.

Suitable thermoplastic resins include polyamides, polyolefines, linear polyesters, halogenated vinyl resins, polycarbonates etc. The reinforcing fiber can be the organic or inorganic reinforcing fiber. The reinforcing fibers are preferably orientated in the longitudinal direction of the reinforcing beam. For example, the thermoplastic resin sheet comprising glass fiber roving or chopped strand is fabricated by a stamp molding method etc. to obtain the reinforcing beam.

We claim:

1. A reinforcing system for reinforcing a metallic panel, including a fiber reinforced plastic reinforcing beam extending substantially in parallel to said panel and comprising:
   at least two flanges whose height extends in perpendicular to said panel, one edge of each said flange being positioned adjacent said metallic panel; and
   a web plate connecting adjoining ones of each of said at least two flanges, each said web plate having a height extending parallel to said panel and being spaced from each said one edge by a distance, said distance being less than one half of said height of said at least two flanges.

2. A reinforcing system according to claim 1 wherein said web plate is connected to said flanges at the position given by the equation $\frac{1}{4}a \leq c \leq \frac{3}{8}a$ wherein a represents said height of said flanges; and c represents a distance from said one edge of each said flange.

3. A reinforcing system according to claim 1 wherein a metallic joint is mechanically fixed on each end of said reinforcing beam and is welded on said metallic panel.

4. A reinforcing system according to claim 1 wherein said reinforcing beam is made of a fiber reinforced plastic which is a thermosettable resin reinforced by reinforcing fibers orientated substantially in the longitudinal direction of said reinforcing beam.

5. A reinforcing system according to claim 1 wherein said metal panel is an outer panel of an automobile.

* * * * *